(12) United States Patent
Robison et al.

(10) Patent No.: US 6,988,224 B2
(45) Date of Patent: Jan. 17, 2006

(54) MEASUREMENT APPARATUS

(75) Inventors: Terry Robison, Citrus Heights, CA (US); Thomas Vachuska, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 579 days.

(21) Appl. No.: 10/284,372

(22) Filed: Oct. 31, 2002

(65) Prior Publication Data

US 2004/0088606 A1    May 6, 2004

(51) Int. Cl.
*G06F 11/00*    (2006.01)

(52) U.S. Cl. .......................... 714/47; 702/190
(58) Field of Classification Search ................ 714/47, 714/48, 43, 44, 39, 37; 702/190, 181, 182
See application file for complete search history.

(56) References Cited

U.S. PATENT DOCUMENTS

| | | | |
|---|---|---|---|
| 5,432,932 A * | 7/1995 | Chen et al. ................. | 718/103 |
| 5,781,703 A * | 7/1998 | Desai et al. ................. | 706/50 |
| 6,446,029 B1 * | 9/2002 | Davidson et al. ........... | 702/186 |
| 6,633,835 B1 * | 10/2003 | Moran et al. ............... | 702/190 |

* cited by examiner

*Primary Examiner*—Nadeem Iqbal

(57) ABSTRACT

A measurement apparatus which is reconfigurable in accordance with at least one category and at least one metric, to apply at least one threshold to the at least one category and at least one metric and generate at least one event exception if the at least one threshold is violated. The measurement apparatus is capable of setting one or more threshold for categories of events.

33 Claims, 9 Drawing Sheets

| Statistics:Statistics |
|---|
| +DOUBLE_EXPONENTIAL_SMOOTHING<br>+BESTE_FIT<br>+HOLT_WINTERS_ADDITIVE<br>+LINEAR<br>+LOGARITHMIC<br>+MOVING_AVERAGE<br>+POLYNOMIAL<br>+SIGNIFICANCE_POLYNOMIAL<br>+SINGLE_EXPONENTIAL_SMOOTHING<br>+TRIPLE_EXPONENTIAL_SMOOTHING |
| +group(in datasets : Collection, in index : int, in interval : Number) : Collection<br>+denormalize(in data : DataElement, in shift : DataElement, in normal : DataElement) : DataElement<br>+getRelationship(in relationship :String, in dataSet : Collection, in interval : Number) : Relationship<br>+getRelationship(in relationship : String, in dataSet : Collection, in interval :<br>              Number, in smoothing : double[ ], in constants : int[ ]) : Relationship<br>+normalize(in data : DataElement, in shift : DataElement, in normal : DataElement) : Collection<br>+reduceData(in dataSets : Collection) : GroupedData Element<br>+removeWeight(in data : Collection)<br>+sampleCount(in data : Collection) : long<br>+subset(in data : Collection, in indices : int[ ]) : Collection<br>+sum(in data : Collection) : DataElement<br>+timeSeriesTransform(in data : Collection, in interval : Number) : List |

| <<interface>><br>Statistics:Relationship |
|---|
| +getCorrelation() : double<br>+getDependentValue(in independentValues : DataElement) : DataElement<br>+getStandardErrorOfEstimate(in independentValues : DataElement) : double<br>+isValid() : boolean<br>+getPredictionIntervalRange(in confidence : double, in dependentValue : DataElement) : Range |

704

| <<interface>><br>Statistics:DataElement |
|---|
| +getType(in index : int) : int<br>+ getTypes() : int [ ]<br>+getValue(in index : int) : Number<br>+getValues() : Number [ ] |

702

MEASUREMENT APPARATUS

BACKGROUND OF THE INVENTION

A storage area network (SAN) is a high-speed, high-bandwidth inter-server network utilizing integrated hardware and software to provide a robust, high-speed storage backbone. A SAN enables clusters of servers to share storage with exclusive data access or to share data on common storage devices, depending on the SAN topology. SAN networks are useful, for example, in fully networked enterprises that require storage of terabytes of information collected on each customer and each transaction. The need for high availability and security of data adds to escalating requirements. SANs offer fast, available pools of storage that can be shared throughout an enterprise, yet managed through simplified operations.

SANs include large collections of storage elements, such as multiple hard disk drives, tapes, etc. To ensure performance in known SANs, data and performance metrics are gathered. These metrics are used to determine performance trends and statistics that are used to anticipate possible problems (such as bandwidth bottlenecks) so that measures can be taken to alleviate the problems before they occur.

In a SAN or other storage environment according to the conventional art, it is known to run a storage area manager (SAM) process on a server within the SAN. As its name implies, the SAM, in part, manages the interaction between components of the storage environment as well as interaction of application programs having storage needs (clients) with components of the storage environment.

During operation of a SAN and SAM, errors and out-of-threshold conditions are often encountered and a large amount of data is available for collection and analysis.

SUMMARY OF THE INVENTION

In an embodiment, the present invention is directed to a measurement apparatus which is reconfigurable in accordance with at least one category and at least one metric, to apply at least one threshold to the at least one category and at least one metric and generate at least one event exception if the at least one threshold is violated. The measurement apparatus is capable of setting one or more threshold for categories of events.

BRIEF DESCRIPTION OF THE DRAWINGS

FIG. 9 is a relationship chart showing class relationships between Measurement Monitor 4041', Statistics 700, DataElement 702, and Relationship 704 according to an embodiment of the invention.

DETAILED DESCRIPTION OF THE EMBODIMENTS

Figure 1:
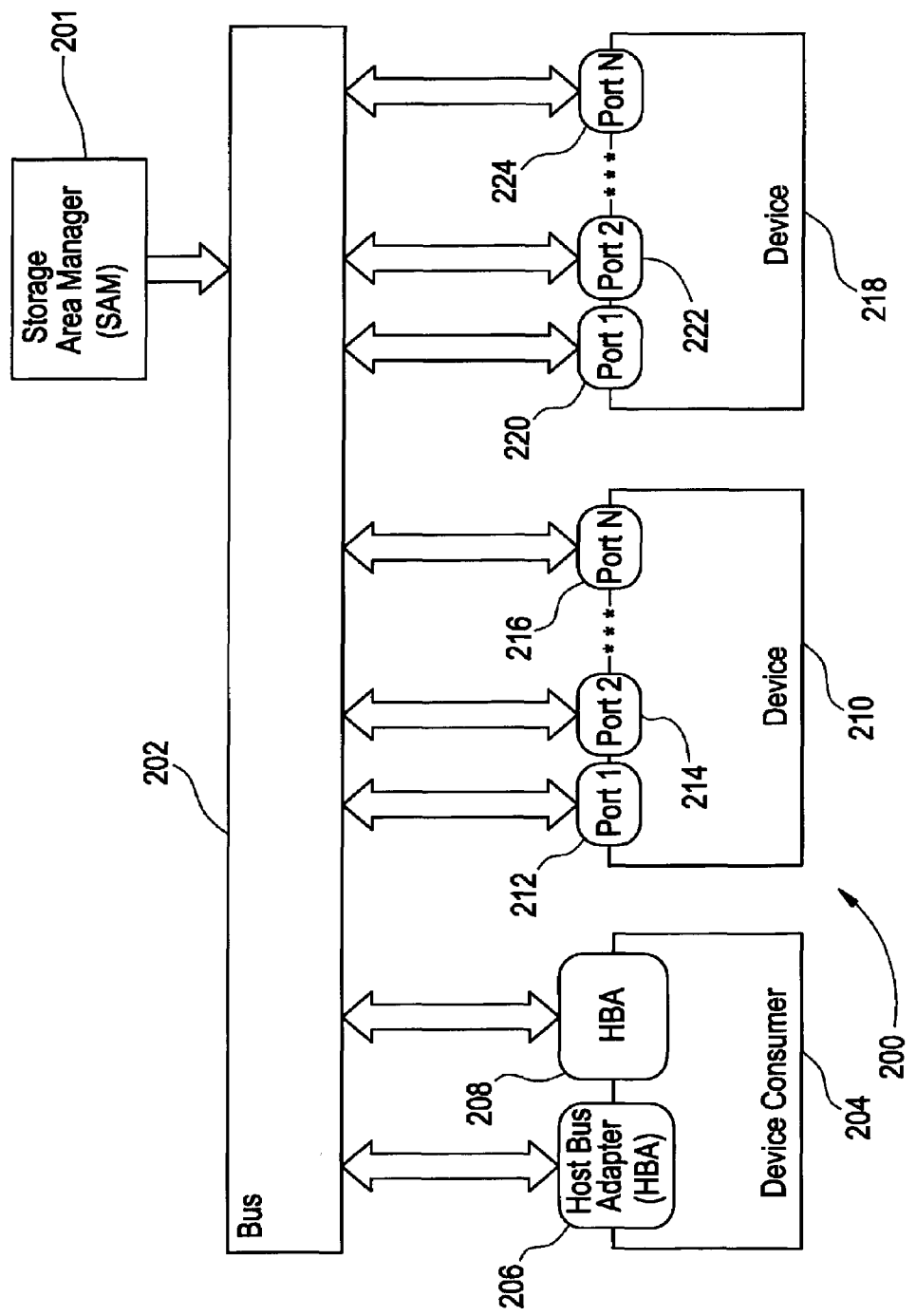
FIG. 1 is a hardware block diagram according to an embodiment of the invention.

FIG. 1 depicts a hardware block diagram of a system 200 according to an embodiment of the invention that incorporates software according to an embodiment of the invention. The system 200 includes a bus (e.g., SCSI, Ethernet (iSCSI/IP/Gbit Ethernet), fiber channel, etc.) 202 to which are connected a consumer of device services (hereafter a device consumer) 204, a device 210, a device 218 and a storage area manager (SAM) 201.

The device consumer 204 includes host bus adapters (HBAs) 206 and 208 that permit the device consumer 204 to connect to and interact with the bus 202. The device 210 has port 1 (212), port 2 (214), . . . port N (216). Device 218 has port 1 (220), port 2 (222), . . . port N (224). For simplicity of disclosure, only two devices 210 and 218 and two HBAs 206 and 208 have been depicted, but fewer or more devices could be attached to the bus and fewer (1) or more HBAs could be present in the consumer depending upon the particular circumstances of a situation.

Figure 2:
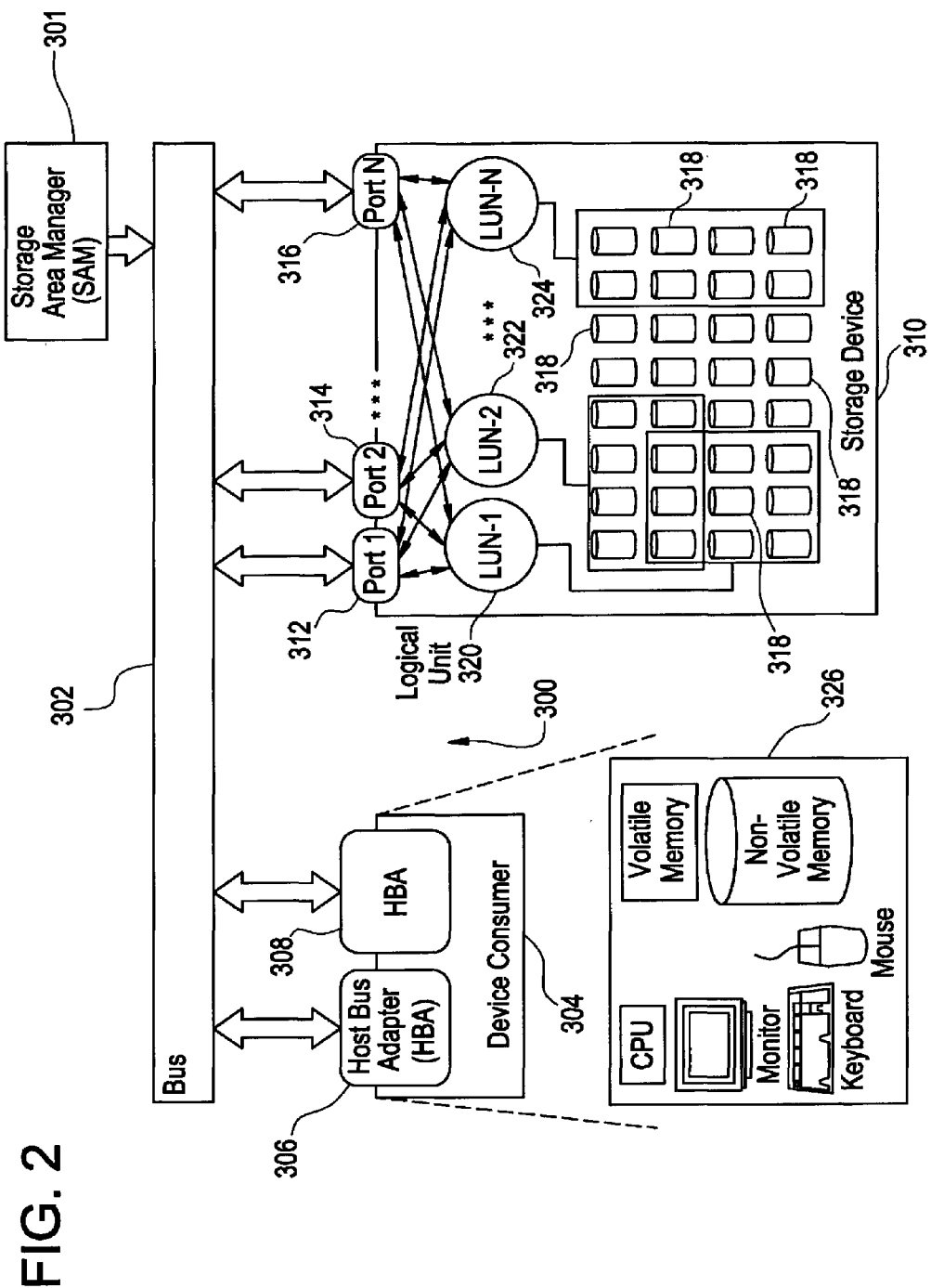
FIG. 2 is a hardware block diagram according to another embodiment of the invention.

FIG. 2 depicts a hardware block diagram corresponding to a particular type of system 200, namely a storage area system or storage area network (SAN) 300. The SAN 300 includes a bus 302, a device consumer 304, a non-volatile storage device 310 and a storage area manager (SAM) 301.

The device consumer 304 can include HBAs 306 and 308. Fewer or greater numbers of HBAs 306/308 can be provided depending upon the circumstances of a situation.

The device consumer 304 can take the form of a computer 326 including at least a CPU, input device(s), output device(s) and memory. For example, the computer 326 has been depicted as including a CPU, an IO device, volatile memory such as RAM and non-volatile memory such as ROM, flash memory, disc drives and/or tape drives.

The storage device 310 includes port 1 (312), port 2 (314), . . . port N (316) and logical units (LUNs) 1, 2, . . . N. Also included in the storage device 310 are non-volatile memories 318 such as disc drives, tape drives and/or flash memory. To remind the reader of the logical nature of a LUN, a simplistic mapping between the LUNs 320, 322 and 324 and physical memory devices 318 has been illustrated in FIG. 2.

The SAM 201, 301 can also take the form of a computer including at least a CPU, input device(s), output device(s) and memory.

The SAM 201, 301 enables storage administrators to manage the SAN 200, 300 environment. The SAM 201, 301 enable storage administrators to control and monitor the health of all the components within the SAN 200, 300, including tape and disk storage, servers and fiber channel switches as well as any directly attached storage.

Figure 3:
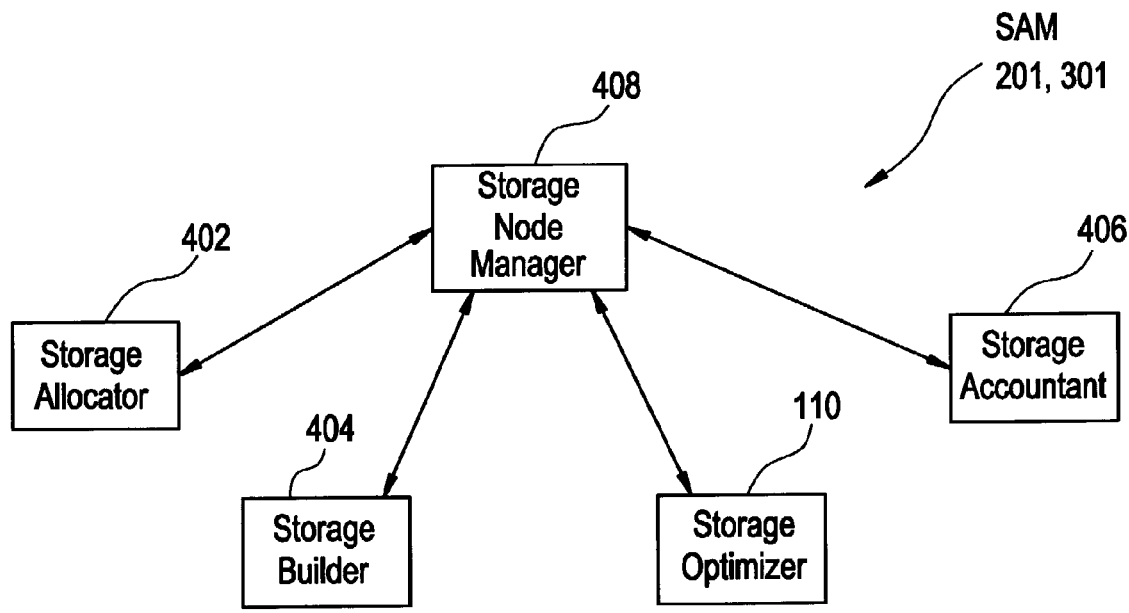
FIG. 3 is a hardware block diagram of the storage area manager (SAM) according to an embodiment of the invention.

As illustrated in FIG. 3, the SAM 201, 301 may include a Storage Allocator 402, a Storage Builder 404, a Storage Accountant 406, a Storage Node Manager 408, and a Storage Optimizer 410.

The Storage Allocator 402 maps storage and servers, and allows the secure allocation of storage to servers. The Storage Allocator 402 permits viewing, managing, and controlling access to data stored in the SAN 200, 300. The Storage Allocator 402 simplifies SAN 200, 300 expansion by allowing storage to be added, removed or assigned without a host reboot. The Storage Allocator 402 also provides storage and network discovery and a graphical user interface (GUI) with filters and icons to show how storage is assigned. The Storage Allocator 402 also allows 'share groups' to be set up, which allow for the configuration of clustered servers.

To securely assign storage to servers to prevent data loss and unauthorized access, a LUN or group of LUNs may be selected using the Storage Allocator 402, by dragging-and-dropping them to a server. If a particular server no longer needs storage, the Storage Allocator 402 permits reassignment to another server, for improved storage utilization.

The Storage Accountant 406 enables service providers to measure storage assigned to end users for financial analysis, budgeting and billing. By classifying the storage offering based on attributes of storage and services associated therewith, users are able to keep track of customer profile, compare the price of storage by gigabytes per hour with the total cost of storage service offering, manage the assignment of LUNs and associate a specific price with the LUN, and calculate charges based on service level price, size of LUNs assigned and duration of storage consumption.

The Storage Accountant 406 can generate usage and billing views in csv, html and XML formats, which can then be integrated with third party billing and financial application, or to maintain an audit log.

The Storage Node Manager 408 provides centralized SAN 200, 300 management through at least one interface, and consolidation of multi-host storage device management tools. Automatic device discovery, health monitoring and automated alerts ensure improved asset availability. Adding, deleting or changing of storage configurations and tracking data center environment changes may be implemented through the at least one interface. The Storage Node Manager 408 also enables system administrators to customize location fields and identify the physical location of devices in distributed environments.

The Storage Optimizer 410 enables users to identify bottlenecks, and enhance the performance of the SAN 200, 300. The Storage Optimizer 410 provides storage managers with the information they need to react to slowdowns and identify bottlenecks by monitoring performance of the entire SAN 200, 300, including hosts, infrastructure and storage.

By monitoring key metrics of SAN 200, 300 performance storage managers are enabled to implement appropriate service levels. The Storage Optimizer 410 collects and manages a range of raw or summarized data, and offers several types of access to it, giving storage managers information needed to improve the SAN 200, 300 operation.

With the use of historical graphs, storage managers can identify trends and anomalies in their SAN 200, 300 infrastructure. Using the Storage Optimizer 410, the impact of system, storage and infrastructure upgrades can be evaluated, and overall SAN 200, 300 performance improved.

The SAM 201, 301 may also include a Storage Builder 404, which assists with the assessment, control and planning of storage capacity, to improve the utilization of resources. The Storage Builder 404 enables administrators to improve the utilization of storage resources by viewing the current allocation and consumption of storage resources by host, storage device, LUN, partition, volume, directory and user, across a variety of operating systems.

By using historical trend data, the Storage Builder 404 may also extrapolate future storage capacity needs. This enables managers to proactively predict when they will need to add capacity. The Storage Builder 404 also may give early warning of potential capacity short-falls, identify files for possible deletion (files which are never accessed, for example, or files with specifically identified extensions), and enable IT managers to create groups whose current usage patterns can then be analyzed for future resource planning purposes.

The Storage Builder 404 also performs distributed data collection and processing of information periodically scheduled for collection on the device consumers 204, 304. In an embodiment, the mechanism for data delivery is event-based and allows event messages to travel from the device consumers 204, 304 to the SAM 201, 301, a connection mechanism allows the SAM 201, 301 to contact and transfer information from the device consumers 204, 304, a work thread queuing mechanism reduces the number of concurrent threads in use at any given time, and a centralized storage mechanism (typically a database, such as device 218, 318), is used for storage.

Figure 4:
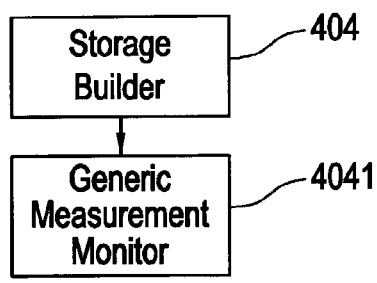
FIG. 4 is a hardware block diagram of the Storage Builder according to an embodiment of the invention.

FIG. 4 illustrates the Storage Builder 404 in more detail. As illustrated, the Storage Builder 404 includes at least one generic Measurement Monitor 4041.

The generic Measurement Monitor 4041 provides a generic capability to monitor selected measurements and generate at least one threshold exceeded event suitable for use with an event system when one or more of the selected measurements exceed one or more threshold boundaries.

Figure 5:
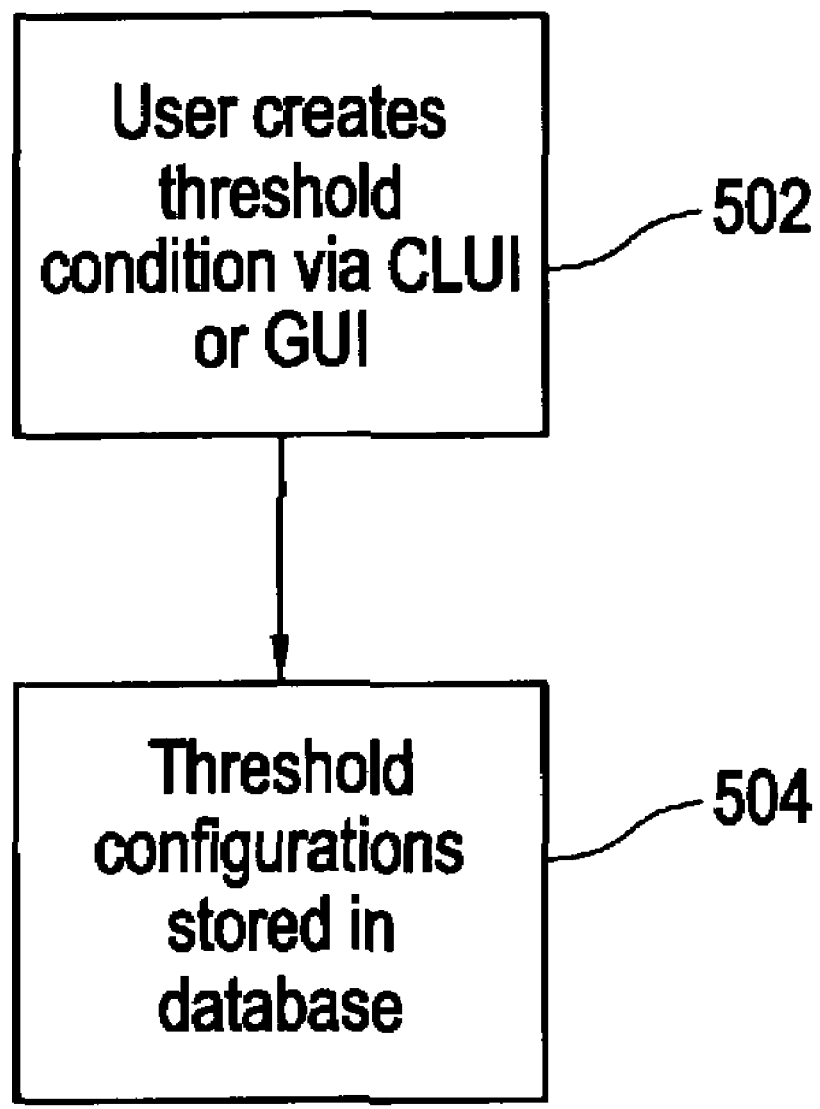
FIGS. 5–6 illustrate creating a generic Measurement Monitor according to an embodiment of the invention.
Figure 6:
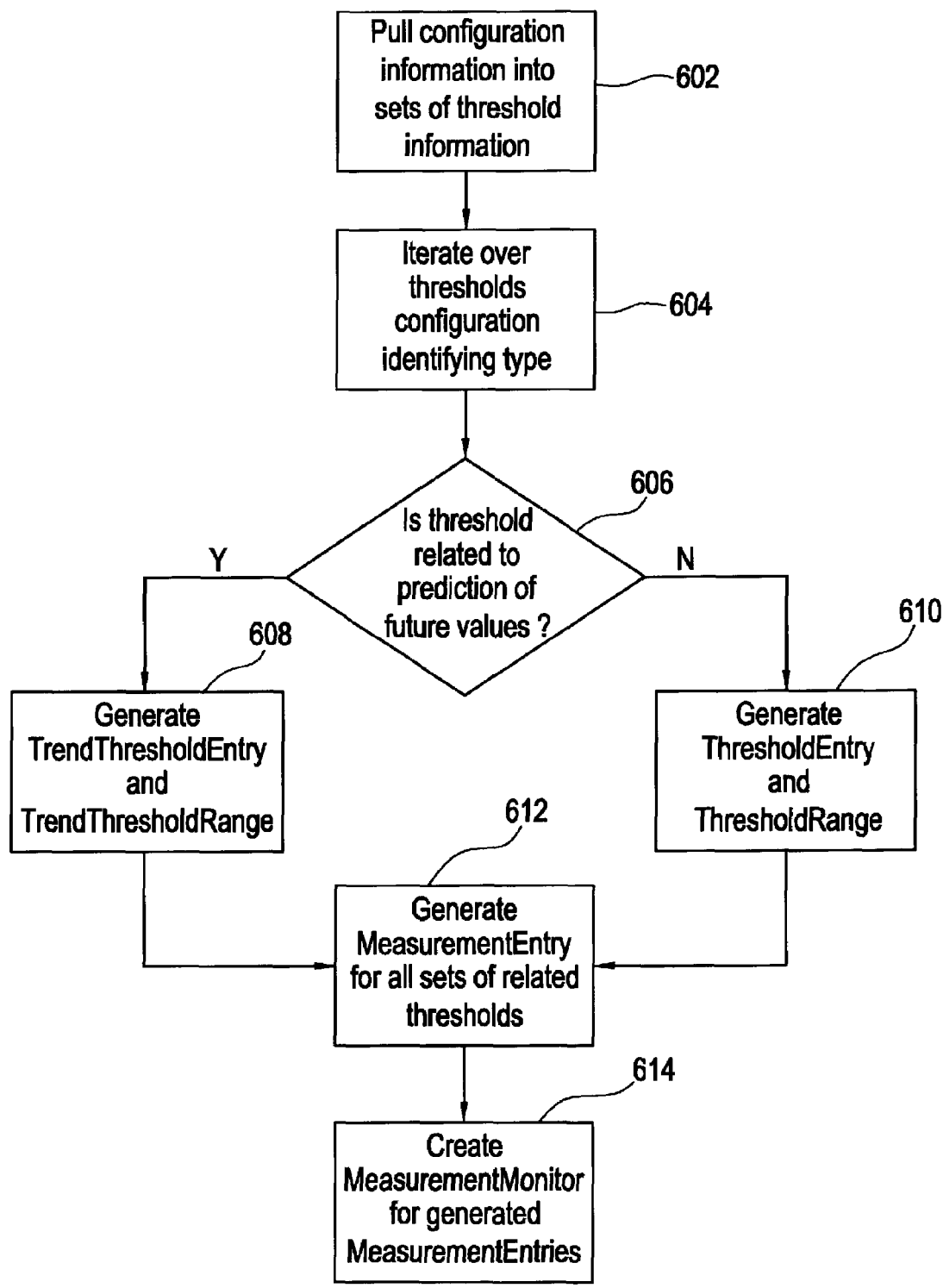
Figure 7:
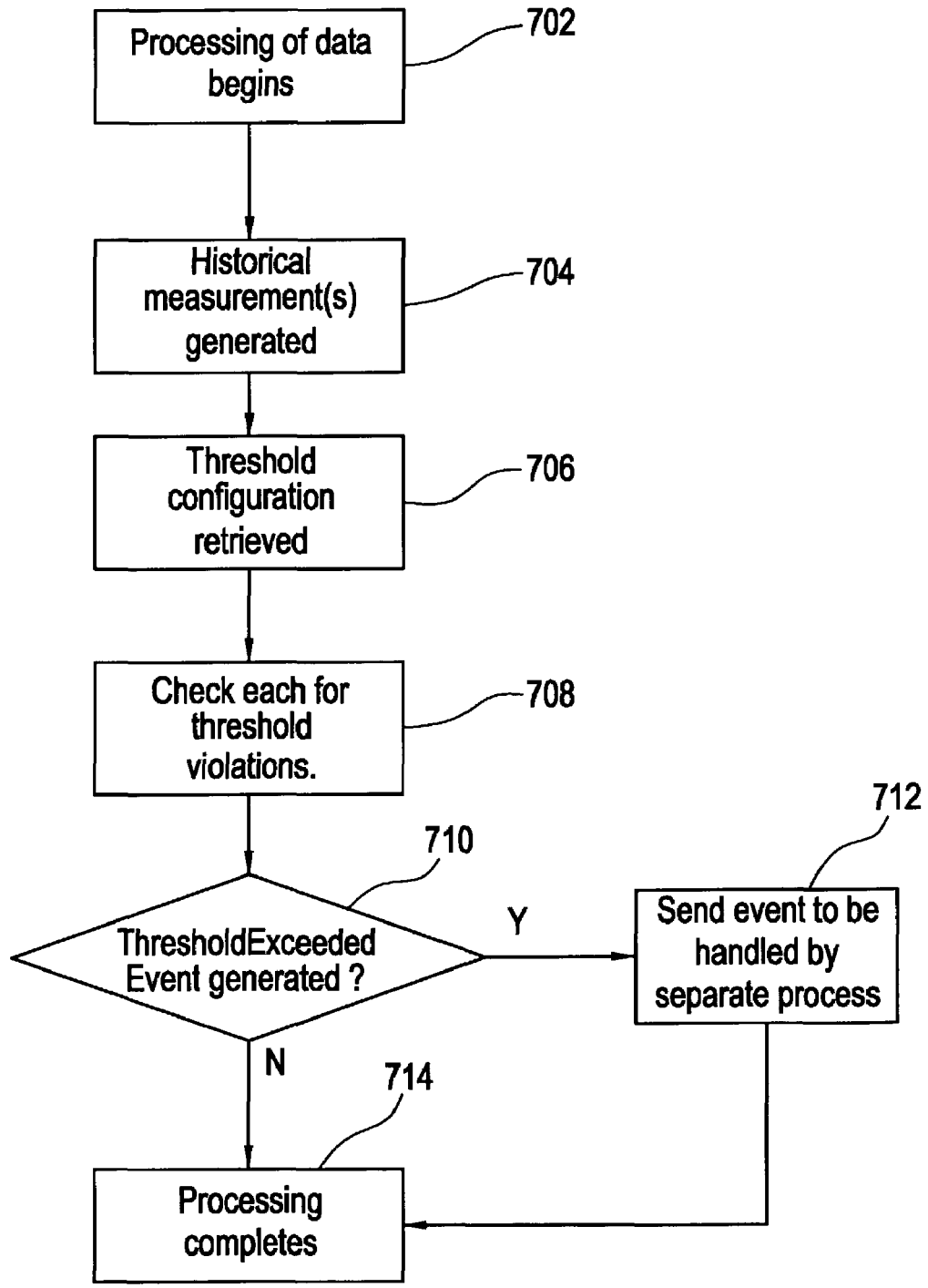
FIG. 7 illustrates operation of a generic Measurement Monitor according to an embodiment of the invention.
Figure 8:
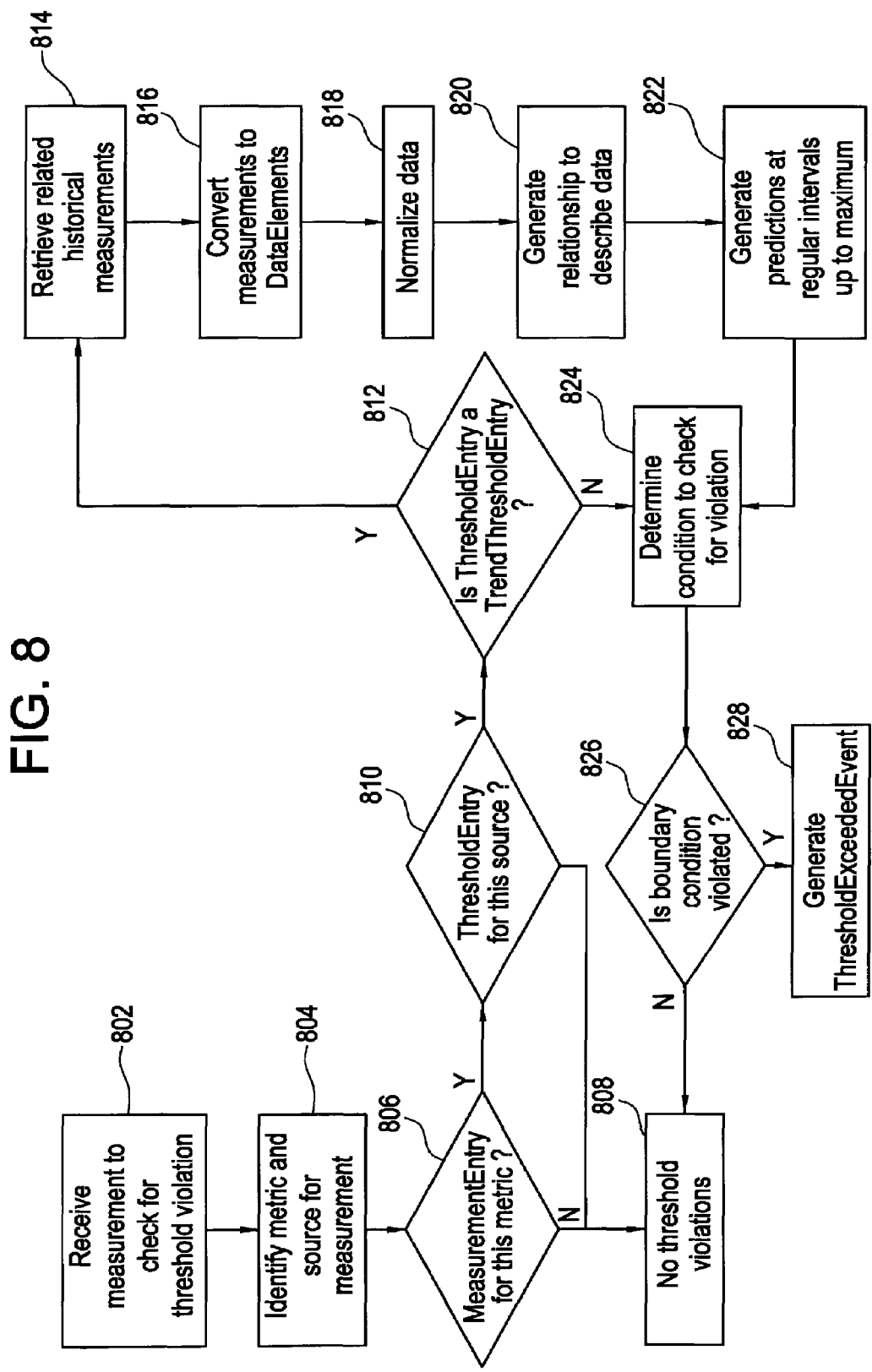
FIG. 8 illustrates operation of a Measurement Monitor according to another embodiment of the invention.

The operation of an embodiment of the invention is illustrated in the flowcharts of FIGS. 5–8. FIGS. 5–6 illustrate an embodiment of creating a generic Measurement Monitor 4041 and FIGS. 7–8 illustrate embodiments of the operation of the generic Measurement Monitor 4041.

As shown at element 502 of FIG. 5, a user may create one or more threshold condition via command line user interface (CLUI) or a graphical user interface (GUI). At element 504, the one or more threshold configurations are stored in a database, such as device 218, 318.

As illustrated in element 602 of FIG. 6, configuration information may then be placed into sets of threshold information. At element 604, an iteration over thresholds configuration identifying type is performed. At element 606, it is determined whether the threshold is related to a prediction of future values. If so, a TrendThresholdEntry 706 and TrendThresholdRange 708 are generated at element 608; if not, a ThresholdEntry 40412 and ThresholdRange 40413 are generated at element 610. In element 612, a measurement entry is generated for all sets of related thresholds and at element 614, a generic Measurement Monitor 4041 is created for the generated measurement entries in element 612.

FIG. 7 illustrates an embodiment of the operation of the generic Measurement Monitor 4041. As illustrated at element 702 the processing of data begins at element 704, the generic Measurement Monitor 4041 generates historical measurements and retrieves one or more threshold configurations at elements 706. At element 708, the generic Measurement Monitor 4041 checks each for threshold violations. At element 710, if a ThresholdExceededEvent 40414 is generated, at element 712, the generic Measurement Monitor 4041 sends the event to be handled by a separate process. If no ThresholdExceededEvent 40414 is generated at element 710, the generic Measurement Monitor 4041 completes processing at element 714.

FIG. 8 illustrates operation of a Measurement Monitor according to another embodiment of the invention. As illustrated at element 802, the Measurement Monitor 4041' receives measurements and checks for threshold violation.

At element 804, the Measurement Monitor 4041' identifies a metric and a source for the measurement. At element 806, the Measurement Monitor 4041' checks the measurement entry for the identified metric. If the measurement entry is not for this metric, no threshold violations are produced at element 808. If the measurement entry is for this metric, a determination is made if the ThresholdEntry 40412 is for a given source. If so, at element 812, it is determined whether the ThresholdEntry 40412 is a TrendThresholdEntry 706. If yes, at element 814, the Measurement Monitor 4041' retrieves related historical measurements and converts the measurements to data elements at element 816. At element 818, the Measurement Monitor 4041' normalizes the data and at element 820, generates a relationship to describe the data.

At element 822, the Measurement Monitor 4041' generates predictions at regular intervals up to a desired maximum. Once the predictions are generated, the Measurement Monitor 4041' determines conditions to check for a violation at element 824. The Measurement Monitor 4041' also determines the condition to check for a violation if the ThresholdEntry 40412 is not a TrendThresholdEntry 706 at element 812. At element 826, the Measurement Monitor 4041' determines whether a boundary condition is violated; if not, no threshold violations are generated at element 808. If a boundary condition is violated at element 826, a ThresholdExceededEvent 40414 is generated at element 828.

As described, the generic Measurement Monitor 4041 and the Measurement Monitor 4041' receive at least one data input from other elements of the Storage Builder 404 and/or other elements of the SAM 201, 301 or the SAN 200,300.

The generic Measurement Monitor 4041 receives the measurement(s) for a particular category and for a particular metric. Examples of categories are type, organization, or entity (where the device consumers 204, 304 of FIGS. 2 and 3 are of category "type").

Examples of metrics are measurements, such as any type of resource utilization, confidence intervals, durations, etc. A metric may be from any source. Example of sources from which the Storage Builder 404 may collect data from are hosts, NAS devices, logical volumes on a host, volume groups on a host, user accounts on a host, domain user accounts, and managed directories. The metric name and the source are two identifiers that may be used for retrieving the right set of metrics to perform any necessary threshold checking.

The category and the metric associated with the measurement are used to identify which of possibly multiple MeasurementEntries 40411 to use for the measurement. The MeasurementEntry 40411 is a threshold or set of thresholds that may be used for all measurements of a particular category and metric.

In an embodiment, there can be multiple types of thresholds that may be considered for each measurement by a given MeasurementEntry 40411, for example, thresholds related to a default for the measurement itself, thresholds related to a default for a particular type of object (hosts, volumes, etc.), thresholds related to a default for all members of an organization, and thresholds related to specific entities (a specific host 204, 304 on the SAN 201, 301). For each type, there can also be multiple ThresholdEntries 40412. Additionally, a ThresholdEntry 40412 may be a specific entry, but may also have one or more ThresholdRanges 40413 associated with it. A ThresholdRange 40413 may be a specific boundary condition that the threshold checks against, and an associated severity in cases of violation.

For each ThresholdEntry 40412, a specific threshold violation can occur, resulting in one or more TresholdExceededEvents 40414 being generated. A TresholdEntry 40412 may check all of TresholdRanges 40413 associated with it (for example, in order of severity level), and indicate a violation when any TresholdRange 40413 is violated.

As an example, in the generic Measurement Monitor 4041, combining an identified category and metric could produce a threshold check of 'hosts' (a type) with 'utilization' over a threshold value 'X'.

In another example, in the generic Measurement Monitor 4041, combining an identified category and metric could produce a threshold check of 'organization A' (all member of this organization) with 'utilization' over the threshold value 'X'.

In yet another example, in the generic Measurement Monitor 4041, combining an identified category and metric could produce a threshold check of 'host A1' (a specific host, rather than all hosts or all hosts of a particular organization) with 'utilization' over the threshold value 'X'.

In other embodiment of the invention, one threshold per type of category may be generated.

In other embodiments of the invention, the threshold generated is the most severe of the set of categories examined.

In another embodiment of the invention, the generic Measurement Monitor 4041 framework fits within the standard JCORE framework or CLAY framework by being a server component that resides on the SAM 201, 301.

An advantage of the generic Measurement Monitor 4041 of FIG. 4 is that all types of threshold checks may be handled in the same manner, for example, volume utilization may be checked in the same manner as user storage utilization can be checked.

Further, the Measurement Monitor 4041' receives at least two data inputs from at least one host 204, 304 or at least one device 210, 310. Each data input may include at least one category and at least one metric. The Measurement Monitor 4041' performs data trending on the at least two data inputs.

As shown in the relationship chart of FIG. 9, the Measurement Monitor 4041' may perform the data trending using any type of statistical trending prediction algorithm Statistics 700 in a generalized statistical analysis package, where the Measurement Monitor 4041' interacts with the analysis package through a DataElement 702 interface defined by the analysis package. The Measurement Monitor 4041' may store the data trending results in a centralized location, such as device 210, 310 or in memory of the SAM 201, 301. The statistical trending prediction algorithm Statistics 700 may use a Relationship 704 interface defined by the analysis package.

The at least two data inputs may be retrieved via a database abstraction layer. In another embodiment of the invention, the Measurement Monitor 4041' may implement the DataElement 702 interface as a four element value, where the four values correspond to the time, value, metric, and source. The Measurement Monitor 4041' may extract out the time and value for the purposes of non-trending thresholds. The value of the measurement may be compared to the values of the range.

Any threshold violation may result in a TresholdExceededEvent 40414 being generated. For trending thresholds, the metric and source elements may be considered. Through the database abstraction layer, all measurements for the source and metric may be retrieved. These measurements are then transformed into a set of DataElements 702 corresponding to X, Y values equal to the value and time. The values may then be normalized in one to two steps: conversion of values to reduce precision lost during analysis, and four time series analysis points are then transformed into a set equally spaced X, Y points using best fit statistical prediction to fill any necessary empty points.

Analysis may then performed and the statistics Relationship 704 generated. The Relationship 704 is then used to sweep through all points leading to the particular prediction point to be examined. If any prediction in the time frame under examination indicates a violation will occur, the entry will signal a violation.

In another embodiment of the invention, the Measurement Monitor 4041' framework fits within the standard JCORE framework or CLAY framework by being a server component that resides on the SAM 201, 301.

Figure 10:
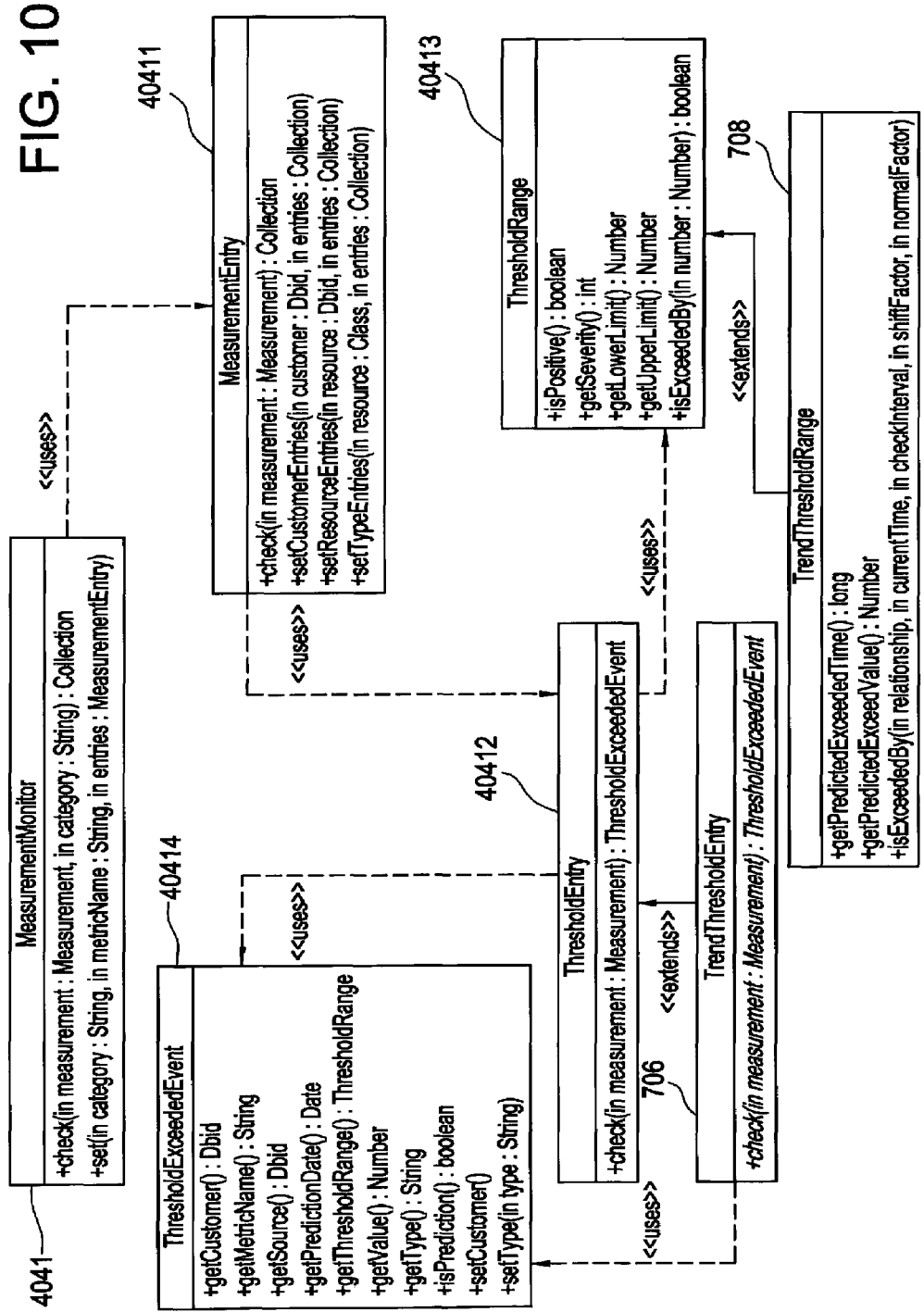
FIG. 10 is a relationship chart showing class relationships between Measurement Monitor 4041, MeasurementEntry 40411, ThresholdEntry 40412, ThresholdRange 40413, ThresholdExceededEvent 40414, TrendThresholdEntry 706, and TrendThresholdRange 708 according to an embodiment of the invention.

FIG. 10 is a relationship chart showing class relationships between Measurement Monitor 4041, MeasurementEntry 40411, ThresholdEntry 40412, ThresholdRange 40 413, ThresholdExceededEvent 40414, TrendThresholdEntry 706, and TrendThresholdRange 708.

FIG. 10 is a relationship chart which combines at least two embodiments of the invention, by adding a TrendThresholdEntry 706 and a TrendThresholdRange 708 from a Measurement Monitor 4041' embodiment with MeasurementEntry 40411, ThresholdEntry 40412, ThresholdRange 40413, and ThresholdExceededEvent 40414 of a generic Measurement Monitor 4041 embodiment.

Although the embodiment of the present invention described above in conjunction with FIG. 4 illustrate one Measurement Monitor 4041, as mentioned above, a Storage Builder 404 of a SAM 201, 301, may include and/or run one or more instances of the Measurement Monitor 4041 and/or one or more instances of the Measurement Monitor 4041' at any given time on any given individual SAM 201, 301. Additionally, as also described above, the SAN 200, 300, may include more than one SAM 201, 301. Additionally, the Measurement Monitor 4041, 4041' functionality could be hosted on one or more of the device consumers 204, instead of or in addition to, one or more SAMs 201, 301 or partitioned across any combination of devices 201, 301, 204.

It is noted that the functional blocks illustrated in FIGS. 1–4 may be implemented in hardware and/or software. The hardware/software implementations may include a combination of processor(s) and article(s) of manufacture. The article(s) of manufacture may further include storage media and executable computer program(s). The executable computer program(s) may include the instructions to perform the described operations. The computer executable program(s) may also be provided as part of externally supplied propagated signal(s) either with or without carrier wave(s).

The embodiments of the generic measurement monitor mechanism described above may be used to provide a user of a SAN 200, 300 with alerts that certain conditions have occurred within the SAN 200, 300.

The embodiments of the measurement monitor mechanism described above may be used to provide a user of a SAN 200, 300 with trending information which may be used to provide a manager of a SAN 200, 300 with utilization of other system trend information, such as volume or storage utilization of the SAN 200, 300.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A measurement monitor code arrangement on a computer-readable medium or media for use in a system having a bus, one or more hosts connected to said bus, a manager, and one or more devices connected to said bus, execution of said code arrangement by one or more processors of the manager enabling data collection and analysis among the one or more hosts and the one or more devices, the code arrangement comprising:
    a generic measurement code portion for receiving at least one data input including at least one category and at least one metric from at least one of the one or more hosts or the one or more devices, wherein said generic measurement code portion is reconfigurable in accordance with the at least one category and at least one metric, to apply at least one threshold to the at least one category and at least one metric, said generic measurement code portion generating at least one event exception if the at least one threshold is violated.

2. The measurement monitor code arrangement of claim 1, wherein the at least one category is at least one of an type, an organization, and an entity and the at least one threshold may be applied to each category.

3. The measurement monitor code arrangement of claim 2, wherein a host is of the type category.

4. The measurement monitor code arrangement of claim 1, wherein the at least one metric is at least one of volume utilization and storage utilization.

5. The measurement monitor code arrangement of claim 1, wherein said generic measurement code portion is configured to adhere to CLAY distributed computing technology or JCORE distributed computing technology.

6. The measurement monitor code arrangement of claim 1, said generic measurement code portion receiving at least two data inputs and performing data trending on the at least two data inputs.

7. The measurement monitor code arrangement of claim 6, said generic measurement code portion calling a statistics utility to perform the data trending.

8. The measurement monitor code arrangement of claim 7, wherein said statistics utility converts the at least two data elements to a standard form, normalizes the at least two data elements, and performs statistical prediction to obtain a data trend.

9. A measurement monitor code arrangement on a computer-readable medium or media for use in a system having a bus, one or more hosts connected to said bus, a manager, and one or more devices connected to said bus, execution of said code arrangement by one or more processors of the manager enabling data collection and analysis among the one or more hosts and the one or more devices, the code arrangement comprising:
    a measurement code portion for receiving at least two data inputs, each data input including at least one category and at least one metric from at least one of the one or more hosts or the one or more devices, said measurement code portion performing data trending on the at least two data inputs.

10. The measurement monitor code arrangement of claim 9, said measurement code portion calling a statistics utility to perform the data trending.

11. The measurement monitor code arrangement of claim 10, wherein said statistics utility converts the at least two data elements to a standard form, normalizes the at least two data elements, and performs statistical prediction to obtain a data trend.

12. A measurement apparatus including a processor operatively coupled to a system having a bus, one or more hosts connected to said bus, and one or more devices connected to said bus, said measurement apparatus enabling data collection and analysis among the one or more hosts and the one or more devices, said measurement apparatus comprising:

at least one generic measurement monitor for receiving at least one data input including at least one category and at least one metric from at least one of the one or more hosts or the one or more devices, wherein said at least one generic measurement monitor is reconfigurable in accordance with the at least one category and at least one metric, to apply at least one threshold to the at least one category and at least one metric, said at least one generic measurement monitor generating at least one event exception if the at least one threshold is violated.

13. The measurement apparatus of claim 12, wherein the at least one category is at least one of an type, an organization, and an entity and the at least one threshold may be applied to each category.

14. The measurement apparatus of claim 13, wherein a host is of the type category.

15. The measurement apparatus of claim 12, wherein the at least one metric is at least one of volume utilization and storage utilization.

16. The measurement apparatus of claim 12, wherein said at least one generic measurement monitor is configured to adhere to CLAY distributed computing technology or JCORE distributed computing technology.

17. The measurement apparatus of claim 12, said at least one generic measurement monitor receiving at least two data inputs and performing data trending on the at least two data inputs.

18. The measurement apparatus of claim 17, said at least one generic measurement monitor calling a statistics utility to perform the data trending.

19. The measurement apparatus of claim 18, wherein said statistics utility converts the at least two data elements to a standard form, normalizes the at least two data elements, and performs statistical prediction to obtain a data trend.

20. A measurement apparatus including a processor operatively coupled to a system having a bus, one or more hosts connected to said bus, and one or more devices connected to said bus, said measurement apparatus enabling data collection and analysis among the one or more hosts and the one or more devices, said measurement apparatus comprising:

at least one measurement monitor for receiving at least two data inputs, each data input including at least one category and at least one metric from at least one of the one or more hosts or the one or more devices, said at least one measurement monitor performing data trending on the at least two data inputs.

21. The measurement apparatus of claim 20, said at least one measurement monitor calling a statistics utility to perform the data trending.

22. The measurement apparatus of claim 21, wherein said statistics utility converts the at least two data elements to a standard form, normalizes the at least two data elements, and performs statistical prediction to obtain a data trend.

23. A method of data collection and analysis in a system having a bus, one or more hosts connected to said bus, and one or more devices connected to said bus, the method comprising:

receiving at least one data input including at least one category and at least one metric from at least one of the one or more hosts or the one or more devices;

reconfiguring a generic processing element in accordance with the at least one category and at least one metric, to apply at least one threshold to the at least one category and at least one metric; and generating at least one event exception if the at least one threshold is violated.

24. The method of claim 23, said receiving including receiving at least two data inputs, said method further comprising:

performing data trending on the at least two data inputs.

25. The method of claim 24, said performing including calling a statistics utility to perform the data trending.

26. An apparatus operable to perform the method of claim 23.

27. A computer-readable medium having code portions embodied thereon that, when read by a processor, cause said processor to perform the method of claim 23.

28. The computer-readable medium of claim 27, wherein said code portions are configured to adhere to CLAY distributed computing technology or JCORE distributed computing technology.

29. A method of data trending in a system having a bus, one or more hosts connected to said bus, and one or more devices connected to said bus, the method comprising:

receiving at least two data inputs, each data input including at least one category and at least one metric from one or more of the hosts or one or more of the devices; and performing data trending on the at least two data inputs.

30. The method of claim 29, said performing including calling a statistics utility to perform the data trending.

31. An apparatus operable to perform the method of claim 29.

32. A computer-readable medium having code portions embodied thereon that, when read by a processor, cause said processor to perform the method of claim 29.

33. The computer-readable medium of claim 32, wherein said code portions are configured to adhere to CLAY distributed computing technology or JCORE distributed computing technology.

* * * * *